United States Patent Office

2,803,598
Patented Aug. 20, 1957

2,803,598

GAMMA RAY POLYMERIZATION OF UNSATURATED ESTERS

James F. Black, Roselle, and William C. Hollyday, Jr., Fanwood, N. J., assignors to Esso Research and Engineering Company, a corporation of Delaware No Drawing. Application October 16, 1953, Serial No. 386,655

6 Claims. (Cl. 204—158)

The present invention relates to an improved method of preparing polymerized esters and to lubricating oils containing the polymeric materials so prepared. More particularly, the invention is concerned with a new method of preparing polyester-type pour point depressant and viscosity index improving additives for lubricating oils and with lubricating oils containing such additives.

In brief compass, the invention pertains to the polymerization and copolymerization of unsaturated esters, particularly those of unsaturated organic acids by exposing mixtures of unsaturated ester monomers to the radiation emitted by sources of high energy radioactivity. By a proper selection of the starting materials, radiation intensity and radiation time, polyesters useful as pour point depressants and viscosity improvers for lubricating oils are formed. Lubricating oils containing such polyesters in improving proportions are one of the important objects of this invention.

Lubricating oil additives derived from esters of unsaturated organic acids, their polymers and copolymers with other esters are well known in the art. Outstanding examples of these additives include simple polymers of esters of monobasic unsaturated aliphatic acids, such as acrylic acid and its derivatives, with saturated or unsaturated alcohols having 1–20 carbon atoms, such as methyl, vinyl, normal or iso-octyl lauryl or similar alcohols; copolymers of esters of unsaturated aliphatic dibasic acids, such as fumaric, maleic and similar acids, with one or more saturated or unsaturated alcohols of the type just specified and esters of saturated aliphatic acids, such as acetic, butyric, 2-ethyl caproic, palmitic, and stearic acid with unsaturated alcohols, such as vinyl, allyl, crotonyl, oleyl or similar alcohols.

These polymeric materials have been prepared heretofore by polymerizing mixtures of the monomeric esters involved at elevated temperatures of about 100°–400° F. in the presence of various catalysts, particularly peroxides, such as benzoyl peroxide and others. This method involves a rather complicated process control since, in many cases, relatively high initial temperatures are required to start the reaction while thereafter the temperature must be carefully controlled and sometimes reduced to prevent over-polymerization or gelation. Also, the product must be treated to remove or neutralize the catalyst or its degradation products as well as certain other by-products which usually interfere with the contemplated use of the polymer. Last but not least, it is difficult to operate this process in a continuous fashion because of the required control of a plurality of process variables, such as time, temperature, catalyst concentration, etc. The present invention overcomes these difficulties and affords various additional advantages as will appear from the description hereinafter.

In accordance with the present invention, polyesters of the type referred to above are prepared by subjecting the unsaturated esters to be polymerized to high energy radioactive radiation for a relatively short period of time sufficient to effect the desired degree of polymerization.

Types of radiation suitable for the purposes of the invention include high energy electro-magnetic radiation, such as gamma rays and X-rays and high velocity electrons, such as beta rays, as well as alpha particles.

These types of radiation may be supplied by naturally occurring radioactive materials, such as radium and its compounds, which emit alpha, beta and gamma rays. Fission by-products of processes generating atomic power and/or fissionable materials, which emit high energy gamma rays, afford a highly desirable and most abundant source of radioactivity suitable for the purposes of the invention. These by-products include elements with atomic numbers ranging from 30 (zinc) to 63 (europium) and their compounds. They are formed in the course of converting uranium, thorium and other fissionable material in an atomic reactor.

Materials made radio-active by exposure to neutron radiation, such as radioactive cobalt ($Co^{60}$), europium 152 or europium 154 which emit gamma rays, may likewise be used. Suitable sources of high velocity electrons are the beams of electron accelerators, such as the Van de Graaf generator or the betatron. In general, however, high intensity gamma radiation and its well-known sources, such as nuclear fission by-products and materials made radioactive by neutron radiation are preferred for the purposes of the invention mainly because of the relatively high penetrating power of the gamma rays and the availability and ease of application of these sources of gamma radiation.

It has been found that unsaturated esters of the type here involved may be polymerized to form valuable viscosity index improvers and pour point depressants by exposure to radiation of the type specified above quite generally at temperatures substantially below 100° F. and usually at room temperatures of, say, about 60°–80° F. Radiation time and intensity largely depend on the degree of polymerization, i. e., the molecular weight, desired for the end product. Within the broad operable ranges of a few seconds to several hours, say about 0.5–48 hours' radiation time and about 10,000–20,000,000 Roentgen per hour (R./hr.) radiation intensity, polymer molecular weights of any desired magnitude ranging, say, from 1000–100,000 Staudinger or more may be produced. Conversion is the higher the longer the radiation time and the higher the radiation intensity, resulting in higher viscosities of the reaction product. In general, the molecular weight of the polymer is the higher the higher the concentration of the reactants in the reaction mixture.

Conditions suitable for the production of most lubricating oil additives coming within the scope of this invention include temperatures of about 0°–150° F., radiation times of about 1–24 hours, preferably about 2–10 hours, and radiation intensities of about 100,000–5,000,000 R./hr., preferably about 200,000–300,000 R./hr. Desirable molecular weights fall within the broad range of about 1000–100,000 Staudinger; usually they range between about 2,000 and 50,000 Staudinger. Preferred molecular weights for pour depressants are about 2,000–20,000 Staudinger; those having viscosity index improving characteristics being somewhat higher, say, about 5,000–25,000 or 30,000 Staudinger. These preferred molecular weight ranges correspond to intrinsic viscosities of about 0.06 to 0.65 for polymers designed as pour depressants, and of about 0.15 to 1.0 for polymers having also viscosity index improving properties. Polymers in these molecular weight ranges, when blended at about 1% concentration with a typical lubricating oil base stock originally having a viscosity of 45 S. U. S. at 210° F., give blends with viscosities in the range of 46 to 58 S. U. S. at 210° F., for polymers designed as pour point depressants, and of about 50 to 70 S. U. S. at 210° F. for polymers having also viscosity index improving characteristics, Polymers and copolymers of higher viscosity which may serve as thickeners for lubricating oils may be produced by employing more severe conditions of radiation time and intensity, as will be understood by those skilled in the art.

The process of the invention has several important advantages. Polymerization by means of radioactive irradiation is no more expensive than polymerization by means of conventional chemical procedures, such as peroxide catalysis. In addition, this process possesses the following advantages:

1. High temperatures are not required to initiate the polymerization reaction. This means that the polymerization may be carried out at ambient temperature without providing heat for the process. With peroxide initiated polymerization, the reaction mixture must be heated to a temperature range in which the peroxide will decompose. In using benzoyl peroxide, one of the more common methods for initiating commercial polymerization reactions, it is necessary to heat the reactants to the neighborhood of 120°–200° F. for polymerization to occur.

2. The reaction is easily controlled. With peroxide polymerization catalysts, the rate at which the chain initiators is produced depends not only upon the concentration of the peroxide and the temperature, but also upon little understood secondary chemical changes in the peroxide decomposition products. The rate at which chain initiating gamma rays are produced by the radioactive source is constant. Therefore, at a given temperature the copolymerization will be quite even and not subject to sudden acceleration or deceleration as is the case with peroxide catalysts. Also, with conventional peroxide catalysis it is necessary to heat the reaction mixture to initiate the polymerization process after which rapid cooling may be required so that the polymerization does not run away. Difficult control problems of this type are avoided in accordance with the invention. As a result, the products have a more uniform molecular weight range which will result in quality advantages such as better shear stability. Another effect of this regular reaction rate is the production of a clear, water-white product which is superior in appearance to that produced by conventional chemical methods.

3. There is no catalyst contamination in the products polymerized by gamma irradiation. Since the radioactive material need not come in direct contact with the reactants, and since the gamma rays themselves are merely particles of light, the problem of removing initiating materials from the resulting polymer does not exist. The absence of catalyst contamination in the final product results in greater thermal stability of the polymer. It should be pointed out that gamma ray irradiation does not make a substance radioactive.

4. Radiation initiation is readily adaptable for continuous polymerization processes. Since the irradiation is given out on a 24 hour basis from an irradiation source, and since its emission is regular and is not affected by temperature or other outside phenomena, the catalytic effect is controlled in radiation initiated polymerizations solely by the time of residence of the reactant within the irradiation zone. For all practical purposes, the initiator is not consumed as is the case with chemical initiators. In addition, a radiation source, such as a gamma source, produces no products which must be removed from the reaction zone. These features permit the design of a plant which can manufacture polymer on a 24 hour basis by merely pumping monomers through the radiation given out by a suitable source.

The starting materials for the radiation-activated reactions of the invention include a wide variety of unsaturated esters. Esters of low molecular weight unsaturated monobasic or dibasic acids having 3–20 carbon atoms per molecule with saturated or unsaturated straight chain or branched chain aliphatic or cyclic alcohols having 1–30 carbon atoms per molecule may be polymerized to form simple polymers having good pour point depressing and viscosity improving characteristics. Examples of these materials are decyl methacrylate, $C_8$–$C_{13}$ Oxo [1] methacrylate; Lorol B [2] methacrylate; Lorol B [2] acrylate; vinyl stearate; vinyl coconate [3]; Lorol B [2] fumarate, hexyl or octyl oleate, etc. For the preparation of lubricating oil additives, it is generally desirable to use ester monomers having an average of at least about 8 carbon atoms per carboxyl group to establish adequate oil solubility.

Esters of low molecular weight unsaturated dibasic aliphatic acids with alcohols of the type just mentioned may be copolymerized with esters of saturated monocarboxylic acids having 2–18 carbon atoms and unsaturated alcohols having 2–4 carbon atoms. Examples are copolymers of $C_8$–$C_{20}$ fumarates, maleates, or itaconates with vinyl acetate, isopropenyl acetate, vinyl butyrate, vinyl coconate, etc.

Specific compounds of this type are well known in the art as shown by such patents as U. S. 1,945,307; 2,020,714; 2,460,035; 2,509,203; 2,560,588; 2,580,053; 2,600,382; 2,600,383; and many more. Other suitable compounds have been disclosed in U. S. patent applications Ser. Nos. 303,827 (Munday and Rogers), 303,829 (Bartlett) and 303,830 (Bartlett) all assigned to the assignee of the present invention. Other examples include the copolymers of mixed alcohol diesters of dibasic acids with unsaturated alcohol esters, such as the copolymer of a mixed alcohol diester of fumaric acid with vinyl acetate.

While all the polymers and copolymers referred to above may be produced efficiently by the process of the present invention, its most important application is in the production of copolymers of unsaturated dibasic acid esters, such as the fumarates, maleates and itaconates with unsaturated alcohol esters, such as vinyl, isopropenyl, or allyl esters of saturated monobasic acids. Outstanding examples of these materials are the copolymers of vinyl acetate with the fumarates, maleates and itaconates of $C_8$–$C_{18}$ saturated straight chain alcohols, such as Lorol B alcohols, or combinations, averaging approximately 8–14 C atoms chain length, of Lorol alcohols with low molecular weight saturated straight chain alcohols having 1–8 carbon atoms, such as ethyl alcohol, butyl alcohol, etc., in proportions of about 0.2–6, preferably about 0.5–5 moles of vinyl ester per mole of fumarate ester, generally corresponding to a weight ratio of about 1–20:1. The production of these materials by radioactive irradiation, particularly gamma radiation, of mixtures of the monomeric constituents is the preferred embodiment of the invention.

In some cases, it is desirable to dilute the reagents during the reaction with a suitable solvent which is substantially inert to gamma irradiation, such as a saturated hydrocarbon, carbon tetrachloride or dioxane. In this manner, cross-linking of the polymer to form oil-insoluble gels is inhibited and the product is obtained in a readily usable form.

The polymers and copolymers prepared in accordance with the invention may be used as lubricating oil additives in concentrations of about 0.001–10 wt. percent, preferably about 0.01–5 wt. percent. When pour depressing is the primary objective, concentrations of about 0.01–0.5 wt. percent are normally sufficient. Larger concentrations of about 0.5–5 wt. percent are usually required for appreciable improvements in the viscosity index of the oils.

The oil base stocks in which the polymers and copolymers of the invention may be used may be paraffinic oils

---

[1] Branched chain alcohols produced by the well-known catalytic oxonation of $C_7$–$C_{12}$ olefins with CO and $H_2$ followed by catalytic hydrogenation of the aldehydes formed.
[2] Commercial mixture of $C_8$–$C_{18}$ (mostly $C_{12}$–$C_{14}$) saturated straight chain alcohols produced by the hydrogenation of cocoanut oil.
[3] Vinyl ester of mixed acids produced by the hydrolysis of cocoanut oil.

which normally require pour depressors as well as naphthenic or mixed base lubricating oils requiring viscosity index improvement, or oil blends required both pour depressing and V. I. improving additives. These oils are preferably of lubricating oil grade having viscosities of about 35 to 150 S. U. S. at 210° F. The polymers and copolymers may also be added to greases, paraffin wax or waxy compositions, lighter hydrocarbon oils, such as diesel fuel base stocks requiring pour depressing or other light oils including domestic heating oil base stocks, mineral seal oil, kerosene, etc.

Oil compositions containing the polymers or copolymers of the invention may be further improved by the addition of conventional modifying agents, such as dyes, antioxidants, tackiness agents, etc., or of other types of pour depressors, such as wax-naphthalene condensation products, wax-phenol condensation products as well as other V. I. improvers, such as polybutenes, polyvinyl ethers, etc.

Conventional means of irradiating materials with radioactive radiation may be employed to carry out the process of the invention. For example, batches of the reaction mixtures may be inserted in, or reactant streams passed through pipes made of, or containing the radioactive material and shielded from the outside to protect the operator. Another suitable arrangement is described in the copending Black et al. application, Ser. No. 368,972, filed July 20, 1953, and assigned to the same interests as the present application. In accordance with this procedure, the radioactive materials are stored in the bottom of a concrete or metal-lined pit which is filled with water to a level sufficient to absorb the radiation being emitted. The radioactive materials may be held in metal containers or under a thin layer of concrete to prevent direct contact with the water. The reactants may either be lowered in batches into the pit or passed through pipes through the pit in a position in which they are adequately exposed to the radiation emitted by the radioactive materials. The water acts as a shield protecting the operator above the pit against radiation. No radiation passes through the ground around the pit. Other suitable means for carrying out the process of the invention may appear to those skilled in the art.

The invention will be further illustrated by the following specific examples.

EXAMPLE I

Several batches of copolymers of Lorol B fumarate and vinyl acetate were prepared as follows. A mixture of 80 wt. percent of caustic-washed Lorol B fumarate and 20 wt. percent of vinyl acetate was dissolved in a highly refined, white mineral oil having a viscosity of 42 S. U. S. at 210° F. to form a 50% solution of the ester mixture in the solvent. The Lorol B fumarate had been prepared by esterifying fumaric acid with slightly less than the theoretical amount of Lorol B alcohol. Lorol B alcohol is a mixture of normal alcohols containing from eight to eighteen carbon atoms and having an average molecular weight of 207. The vinyl acetate was obtained by redistilling a commercial grade of the monomeric ester.

Aliquot portions of the dissolved ester mixture were exposed in batch operation to the radiation emitted by radioactive cobalt ($Co^{60}$) at different conditions of temperature, time and radiation intensity. The radioactive cobalt was used in the form of a pipe. The samples were placed in a sealed glass container contained in an aluminum canister which was introduced into the center of the pipe. The radioactive cobalt was contained in a lead pig absorbing harmful radiation to the extent that the operator could work within 6 ft. of the unit at all times. The samples in the pipe were exposed to a radiation intensity of about 235,000 R./hr. The polymerized samples were then tested for their pour point depressing activity by adding the same in various concentrations to two lubricating oils of different pour points, namely, a Mid-Continent SAE-10 oil having an ASTM pour point of +10° F. and a Mid-Continent SAE-20 oil having an ASTM pour point of +15° F. The specific conditions and results of these experiments and tests are tabulated below.

*Table I*

GAMMA INITIATED POLYMERIZATION OF LOROL B FUMARATE-VINYL ACETATE

| No. | Irradiation Conditions | | | Final Visc. (210° F., 50% Solution) | Pour Depressing Potency | | | |
|---|---|---|---|---|---|---|---|---|
| | | | | | Mid-Continent SAE 10 | | Mid-Continent SAE 20 | |
| | Temp., °F. | Time (hrs.) | Dosage (Roentgens) | | Conc. (Percent) | Pour Point (°F.) | Conc. (Percent) | Pour Point (°F.) |
| | | 0 | 0 | 37.9 | | +10 | | +15 |
| | | | | | 0.10 | −20 | 0.10 | −20 |
| 1 | 70 | 3 | 705,000 | 167.1 | 0.05 | −15 | 0.05 | −15 |
| | | | | | 0.03 | −20 | 0.03 | −15 |
| | | | | | 0.01 | −15 | 0.01 | −5 |
| | | | | | 0.10 | −20 | 0.10 | −15 |
| 2 | 70 | 8 | 1,880,000 | 474.5 | 0.05 | −15 | 0.05 | −15 |
| | | | | | 0.03 | −15 | 0.03 | −15 |
| | | | | | 0.01 | 0 | 0.01 | 0 |
| | | | | | 0.10 | −30 | 0.10 | −20 |
| 3 | 70 | 24 | 6,000,000 | 565.7 | 0.05 | −20 | 0.05 | −20 |
| | | | | | 0.03 | −20 | 0.03 | −20 |
| | | | | | 0.01 | −15 | 0.01 | −15 |
| | | | | | 0.10 | −30 | | |
| 4 | 70 | 49 | 11,615,000 | 282.6 | 0.05 | −25 | | |
| | | | | | 0.03 | −15 | | |
| | | | | | 0.01 | +5 | | |
| 5 | 0 | 3 | 705,000 | ¹39.0 | 0.5 | −25 | 0.05 | −15 |
| 6 | 0 | 8 | 1,880,000 | ¹41.6 | 0.5 | −25 | 0.5 | −15 |
| 7 | 0 | 24 | 5,640,000 | ¹59.4 | 0.5 | −25 | 0.5 | −15 |
| 8 | 150 | 3 | 705,000 | 274.7 | 0.5 | −25 | 0.5 | −15 |
| 9 | 150 | 8 | 1,880,000 | 493.3 | 0.5 | −25 | 0.5 | −15 |
| 10 | 150 | 24 | 5,640,000 | 342.1 | 0.5 | −25 | 0.5 | −15 |

¹ Toluene, used as solvent during polymerization, was replaced with white oil for viscosity tests.

The data reported above demonstrate that an excellent copolymer type pour depressant may be produced by simply exposing a mixture of the monomers in a suitable solvent to high intensity gamma radiation for as little as 3 hours at room temperature and without any conventional catalyst. The pour point depressing potency of this material was equal to that of peroxide polymerized products. The data in the above table also show a continuation of the polymerization reaction beyond 3 hours resulted in no appreciable increase in potency for the pour point depressant. In fact, extension of the irradiation time from 24 hours to 49 hours resulted in one specific case even in a loss of viscosity for the final polymer and a reduction of the pour point depressing potency for lower concentrations of the depressant (see Table I, No. 4).

EXAMPLE II

A mixture of 80 wt. percent of Lorol B maleate and 20 wt. percent of vinyl aceate was prepared and dissolved in a white mineral oil to form a 50% solution of the esters, and aliquot portions of this solution were irradiated with gamma rays, all substantially as described in Example I. The viscosities of the treated oil blends were determined. The radiation conditions and product viscosities are tabulated below.

The production of a satisfactory pour point depressant from this mixture of monomers is merely a case of selecting the proper irradiation time and the proper concentration of monomer in the reaction mixture, which may range between about 20 to 80%.

EXAMPLE III

A copolymer of a mixed fumarate ester with vinyl acetate was prepared by blending about 67 parts by weight of di-Lorol B fumarate, 10 parts by weight of di-ethyl-fumarate and 23 parts by weight of vinyl acetate and subjecting the mixture to radiation polymerization substantially as described in Example I at a temperature of about 70° F. for about 24 hours, using a radiation dosage of about 5,000,000 Roentgens. An 80% solution of the polymerizable material in a highly refined white oil of 42 S. U. S. viscosity at 200° F. was used for polymerization. For comparison, a di-Lorol B fumarate-polyvinyl acetate copolymer was prepared at similar conditions from a mixture of about 80 wt. percent of di-Lorol B fumarate and 20 wt. percent of vinyl acetate. The polymerized materials were added in small proportions to mineral base oils and tested for their viscosity. Viscosity index and pour point with the results tabulated below.

Table III

| Material Tested | Lubricating Oil [1] Blend of Concentration Indicated | | | | Lubricating Oil [2] Blend of Concentration Indicated | | |
| --- | --- | --- | --- | --- | --- | --- | --- |
| | Viscosity S. U. S. at 210° F. | | V. I. | | Pour Point, ° F. | | |
| Base Oil | 46.5 | | 113 | | +15 | | |
| | 3.6 Wt. Percent | 5.0 Wt. Percent | 3.6 Wt. Percent | 5.0 Wt. Percent | 0.002 Wt. Percent | 0.03 Wt. Percent | 0.10 Wt. Percent |
| Lorol-Ethyl Fumarate-Vinyl Acetate | 60.5 | 71.5 | 149.2 | 151.7 | 0 | −10 | −15 |
| Di-Lorol Fumarate-Vinyl Acetate | 78.3 | | 143.0 | | −15 | −20 | |

[1] Base oil was a highly refined commercial lubricating oil.
[2] Base oil was a Mid-Continent SAE 20 oil.

Table II
GAMMA INITIATED POLYMERIZATION OF LOROL MALEATE-VINYL ACETATE

| No. | Temp. (° F.) | Time (Hrs.) | Dosage (Roentgens) | Final Viscosity (100° F., SUS) |
| --- | --- | --- | --- | --- |
| 11 | 70 | 0 | 0 | 59.9 |
| 12 | 70 | 24 | 5,640,000 | Solid Gel |
| 13 | 70 | 1 | 235,000 | [1] 71.6 |
| 14 | 70 | 3 | 705,000 | [1] 120.2 |
| 15 | 0 | 8 | 1,880,000 | [1] 305.0 |
| 16 | 0 | 1 | 235,000 | [1] 67.5 |
| 17 | 0 | 3 | 705,000 | [1] 94.4 |
| | 0 | 8 | 1,880,000 | [1] 305.9 |

[1] Clear, water-white, fluid blends.

These data show that thick polymers may be produced with gamma irradiation times of 8 hours. Irradiation for a period of 24 hours, however, will produce a solid gel. Although the gel which was produced was not completely hydrocarbon soluble, blends containing approximately 0.5 wt. percent of this material in the Mid-Continent SAE-10 and 20 bases mentioned in Table I gave ASTM pour points of <−35° F. and −20° F., respectively.

It will be noted that the mixed fumarate ester-vinyl acetate copolymer, which had an average alcohol chain length in the fumarate ester of about 10 carbon atoms is a superior viscosity index improver, having excellent pour point depressing characteristics. This highly desirable combination of properties distinguishes this novel copolymer type from prior art polyester type additives.

EXAMPLE IV

Several batches of different simple esters of unsaturated monobasic acids were subjected to gamma radiation for different times substantially as described in Example I. The esters were prepared in the conventional manner by ester exchange reactions in the presence of a strong mineral acid. Solutions of 20% and 50% of the esters in a white mineral oil were used for viscosity determinations of the irradiated esters. Blends in a highly refined commercial motor oil containing 3.6 wt. percent of active ingredients were tested for viscosity at 100 and 210° F. from which viscosity index was calculated. The composition of the esters used, the reaction conditions and the test results are tabulated below.

Table IV
GAMMA INITIATED POLYMERIZATION OF V. I. IMPROVERS

| No. | Monomers | Irradiation Conditions | | | Product Viscosity | | | Viscosity and V. I. of 3.6% Active Ingredient Blends in Motor Oil | | |
|---|---|---|---|---|---|---|---|---|---|---|
| | | Temp. (°F.) | Time (Hrs.) | Dosage (Roentgens) | Conc. in Solvent, Percent | Visc. (SUS) | | Vis./100° F. | Vis./210° F. | V. I. |
| | | | | | | 100° F. | 210° F. | | | |
| 18 | $C_{13}$ Oxo-Methacrylate | 70 | 1 | 235,000 | 50 | 67.5 | | | | |
| | | 70 | 3 | 705,000 | 20 | | 1202 | 571.5 | 99.9 | 142.3 |
| | | 70 | 8 | 1,880,000 | 20 | | 1003 | 485.1 | 86.7 | 142.0 |
| | | 0 | 1 | 235,000 | 50 | 55.6 | | | | |
| | | 0 | 3 | 705,000 | 20 | | 1179 | 571.0 | 101.6 | 143.0 |
| | | 0 | 8 | 1,880,000 | 20 | | 1162 | 569.2 | 100.7 | 142.7 |
| | | | | 0 | 50 | ca. 55 | 34.1 | | | |
| 19 | 80% $C_8$ Oxo-20% Lorol B Methacrylate | 70 | 1 | 235,000 | 50 | ca. 60 | | | | |
| | | 70 | 3 | 705,000 | 20 | | 557.6 | 352.0 | 72.8 | 147.2 |
| | | 70 | 8 | 1,880,000 | 20 | | 583.9 | 348.3 | 71.7 | 146.5 |
| | | | | 0 | 50 | | <32 | | | |
| 20 | $C_8$ Oxo-Methacrylate | 70 | 1 | 235,000 | 50 | 546.6 | | | | |
| | | 70 | 3 | 705,000 | 20 | | 847.2 | 363.1 | 77.1 | 149.2 |
| | | 70 | 8 | 1,880,000 | 20 | | 764.4 | 345.6 | 73.2 | 148.6 |
| | | | | 0 | 50 | | <32 | | | |
| Typical 80% $C_8$ Oxo-20% Lorol B Methacrylate Prepared by Peroxide Process | | | | | | | | 355.1 | 72.2 | 146.0 |
| Commercial Methacrylate V. I. Improver | | | | | | | | 355.0 | 73.8 | 147.2 |
| Lubricating Oil Base Stock | | | | | | | | 174.0 | 45.7 | 113.0 |

The data presented above show that 3 hours of gamma irradiation is sufficient to produce methacrylate V. I. improvers which are as potent as the best now offered on the market. Extension of the irradiation time to 8 hours produces no increase in the V. I. ceiling. Polymerization conducted at 0° F. appears to produce no different thickening power or V. I. ceiling than that achieved with polymerizations carried out at room temperature.

The polymerization of various other esters in accordance with the invention is illustrated in the following example.

EXAMPLE V

Various esters were prepared and polymerized substantially as described in Example IV, except that no diluent was used during irradiation except where noted. The composition of the esters, the reaction conditions and some product properties are tabulated below.

Table V
OTHER GAMMA INITIATED POLYMERIZATIONS
[Irradiation conditions]

| No. | Monomers | Temp. (°F.) | Time (Hrs.) | Dosage (Roentgens) | Result |
|---|---|---|---|---|---|
| 21 | $C_{13}$ Oxo Methacrylate | 70 | 24 | 5,640,000 | Sticky, gelled solid. Flows very slowly. Insoluble in hydrocarbons. |
| 22 | Lorol B Fumarate (100%) | 0 | 24 | 5,640,000 | Apparently no polymerization in solid phase (melting point of monomer ca. 145° F.) since product is not a pour point depressant. |
| 23 | Lorol B Fumarate (50% in Benzene) | 0 | 24 | 5,640,000 | Viscous oil. Active pour depressant. |
| 24 | Lorol B Fumarate (50% in White Oil) | 70 | 24 | 5,640,000 | Do. |
| 25 | ----do---- | 150 | 24 | 5,600,000 | Do. |
| 26 | Vinyl Coconate (50% in White Oil) | 0 | 8 | 1,880,000 | Viscous oils. All active pour depressants. |
| 27 | ----do---- | 0 | 24 | 5,640,000 | |
| 28 | ----do---- | 0 | 48 | 11,280,000 | |
| 29 | ----do---- | 70 | 24 | 6,000,000 | |

Under the conditions of Example V, some of the monomers used appear to polymerize more slowly than the monomers which have been previously discussed. However, satisfactory polymers useful as pour depressants were obtained with these materials, except for products Nos. 21 and 22. Data are given in the following table:

Table VI
MISCELLANEOUS POUR DEPRESSANTS

| No. | Monomers | Pour Depressing Potency | | | |
|---|---|---|---|---|---|
| | | Mid-Continent SAE 10 [1] | | Mid-Continent SAE 20 [2] | |
| | | Conc. Percent | Pour Point, °F. | Conc. Percent | Pour Point, °F. |
| 23 | Lorol B Fumarate | 0.5 | −15 | 0.5 | −5 |
| 24 | ----do---- | 0.5 | −10 | 0.5 | −10 |
| 25 | ----do---- | 0.5 | −20 | 0.5 | −10 |
| 28 | Vinyl Coconate | 0.10 | −25 | 0.10 | −20 |
| | | 0.05 | −20 | 0.05 | −20 |
| | | 0.03 | −20 | 0.03 | 0 |

[1] Pour point of base stock, +10° F.
[2] Pour point of base stock, +15° F.

The invention is not limited to the specific figures of the foregoing examples. The relative proportions of the materials used and the reaction conditions may be varied within the limits indicated in the specification to obtain products of varying characteristics.

What is claimed is:

1. The method of producing a polyester product useful in lubricating oils which comprises exposing monomers of unsaturated organic esters, having an average of at least about 8 carbon atoms per carboxyl group and formed from aliphatic carboxylic acids having 3 to 20 carbon atoms and alcohols having 1 to 30 carbon atoms, to gamma radiation in the range between $1 \times 10^4$ and $2 \times 10^7$ roentgens per hour, for a time sufficient to form a polyester having a molecular weight in the range between about 2,000 and 50,000 Staudinger, the irradiation of said monomers being carried out with the monomers dissolved in a solvent substantially inert to said radiation, said solvent being present in an amount between about 20 to 80% by weight, based on the weight of the total mixture.

2. The method of claim 1 wherein said esters comprise simple esters of unsaturated aliphatic acids having 3 to 20 carbon atoms with alcohols having 1 to 30 carbon atoms, said esters having an average of at least about 8 carbon atoms per carboxyl group.

3. The method of claim 2 wherein said esters are copolymerized with a simple ester of a saturated monocarboxylic acid having 2 to 18 carbon atoms with an unsaturated alcohol having 2 to 4 carbon atoms.

4. The method of claim 1 wherein said solvent is selected from the group consisting of white mineral oil, toluene, benzene, carbon tetrachloride and dioxane.

5. The method of producing a polyester product useful in lubricating oils which comprises exposing the fumarate of $C_8$ to $C_{18}$ mixed saturated straight chain alcohols obtained by the hydrogenation of coconut oil to gamma radiation of intensity in the range between about $1 \times 10^4$ and $2 \times 10^7$ roentgens per hour at a temperature substantially below 100° F. and for a time between about 0.5 to 48 hours, sufficient to form a polyester having a molecular weight in the range between about 2,000 and 50,000 Staudinger, the irradiation of the fumarate being carried out with said fumarate dissolved in benzene and said benzene being present in an amount between about 20 to 80% by weight, based on the total weight of the mixture.

6. The method of producing a polyester useful in lubricating oils which comprises exposing a mixture of the fumarate of $C_8$ to $C_{18}$ saturated straight chain alcohols obtained by the hydrogenation of coconut oil together with vinyl acetate to gamma radiation of intensity in the range between about $1 \times 10^4$ and $2 \times 10^7$ roentgens per hour at a temperature substantially below 100° F. and for a time between about 0.5 to 48 hours sufficient to form a polyester having a molecular weight in the range between about 2,000 and 50,000 Staudinger, the irradiation of the mixture being carried out with said mixture dissolved in white mineral oil said white mineral oil being present in an amount between about 20 to 80% by weight, based on the weight of the total mixture.

References Cited in the file of this patent

UNITED STATES PATENTS

| | | |
|---|---|---|
| 1,818,073 | Long | Aug. 11, 1931 |
| 2,600,446 | Van Horne et al. | June 17, 1952 |
| 2,615,845 | Lippincott et al. | Oct. 28, 1952 |
| 2,668,133 | Brophy et al. | Feb. 2, 1954 |

FOREIGN PATENTS

| | | |
|---|---|---|
| 665,262 | Great Britain | Jan. 23, 1952 |
| 1,079,401 | France | May 19, 1954 |

OTHER REFERENCES

"Modern Plastics," September 1954, pages 150, 237 and 238.

Protective and Decorative Coatings, by J. J. Mattiello, vol. I, John Wiley and Sons, N. Y., 1941, pp. 61 to 63, 69.

Comptes Rendus, 228, pp. 1490–2 (1949).